United States Patent
Jia et al.

(10) Patent No.: US 11,440,801 B2
(45) Date of Patent: *Sep. 13, 2022

(54) TREATMENT OF SPENT CANNABIS BIOMASS WITH ACTIVATING AGENT

(71) Applicant: Nextleaf Solutions Ltd., Coquitlam (CA)

(72) Inventors: Xuan Jia, Burnaby (CA); David Michael Novitski, Burnaby (CA)

(73) Assignee: Nextleaf Solutions Ltd., Vancouver (CA)

( * ) Notice: Subject to any disclaimer, the term of this patent is extended or adjusted under 35 U.S.C. 154(b) by 436 days.

This patent is subject to a terminal disclaimer.

(21) Appl. No.: 16/706,666

(22) Filed: Dec. 6, 2019

(65) Prior Publication Data

US 2021/0171354 A1    Jun. 10, 2021

(51) Int. Cl.
| | |
|---|---|
| *C01B 31/08* | (2006.01) |
| *C01B 32/318* | (2017.01) |
| *B01D 8/00* | (2006.01) |
| *C01B 32/378* | (2017.01) |
| *C01B 32/348* | (2017.01) |

(52) U.S. Cl.
CPC .............. *C01B 32/318* (2017.08); *B01D 8/00* (2013.01); *C01B 32/348* (2017.08); *C01B 32/378* (2017.08)

(58) Field of Classification Search
CPC ................................................... C01B 32/318
See application file for complete search history.

(56) References Cited

U.S. PATENT DOCUMENTS

| | | | |
|---|---|---|---|
| 9,478,365 B2 * | 10/2016 | Mitlin | ............. H01G 11/36 |
| 11,027,229 B1 * | 6/2021 | Strait, III | ......... B01D 39/1646 |
| 11,292,722 B2 * | 4/2022 | Novitski | ............. C01B 32/324 |

OTHER PUBLICATIONS

Rodriguez-Reinoso, F., et al. 1992. Activated carbons from lignocellulosic materials by chemical and/or physical activation: an overview. in: Carbon, vol. 30, No. 7.

Oginni, O. 2018. Characteristics of activated carbons produced from herbaceous biomass feedstock. in: Wood Science and Technology, vol. Ph D., West Virginia University. Morgantown, WV.

* cited by examiner

*Primary Examiner* — Stuart L Hendrickson
(74) *Attorney, Agent, or Firm* — Damien G. Loveland

(57) ABSTRACT

A process to transform spent *cannabis* biomass into activated carbon via a treatment involving a chemical activation process. The spent *cannabis* biomass is mixed with an activating agent and then subjected to a heat treatment. The spent *cannabis* biomass is heated in stages, the first to remove water and volatile components, and the second to reclaim leftover cannabinoids. During a third, higher temperature stage, the biomass is converted to activated carbon.

18 Claims, 2 Drawing Sheets

TREATMENT OF SPENT CANNABIS BIOMASS WITH ACTIVATING AGENT

TECHNICAL FIELD

Spent *cannabis* biomass is treated in order to be recycled and reduce waste. More specifically, spent *cannabis* biomass is impregnated with a chemically activating agent and subjected to a heat treatment.

BACKGROUND

The growth of *cannabis* production in the world poses a considerable problem, i.e. how to properly dispose of the waste biomass. Currently licensed *cannabis* producers send waste biomass to landfills. However, as production increases, the volume of waste biomass has the potential to become too large for current waste management infrastructure to deal with. In addition, as more companies start to grow and/or process *cannabis*, the increased supply will inevitably reduce the price for this commodity, as has been seen in USA state jurisdictions such as Oregon. As the *cannabis* industry matures in the world, it will be important for companies to adopt ways to maintain revenue. The reuse/recycling of waste biomass could be used to offset the reduction in *cannabis* commodity prices.

The process of cannabinoid extraction, regardless of method, whether it be carbon dioxide ($CO_2$) or ethanol extraction, for example, is complicated in a commercial setting. This is due to the problem of obtaining sufficient return on investment in processing. During processing, cannabinoids can be left in spent *cannabis* biomass due to either cannabinoid saturation in a single solvent extraction pass, or because it is more cost effective in terms of output of oil per day to stop the process with a "mostly spent" batch, and start with fresh biomass.

In possibly the most extreme case, when using $CO_2$ extraction, some 20% of cannabinoids may be left in the waste biomass as it takes too long to recover the remaining cannabinoids. These cannabinoids are typically unrecovered as it saves time during production to start with a fresh batch of *cannabis* which allows for 80% extraction. In ethanol extraction, around 5% of cannabinoids, or more, may remain in the waste biomass. A large problem with *cannabis* extraction is that the spent *cannabis* biomass needs to be denatured and disposed of, which leads to lost product throughout the industry.

This background is not intended, nor should be construed, to constitute prior art against the present invention.

SUMMARY OF INVENTION

Waste *cannabis* biomass from a *cannabis* extraction process is recycled into activated carbon, which is widely used as a purification/adsorption material in industry, including the *cannabis* industry. This invention therefore creates an opportunity to denature spent *cannabis* biomass into a valuable commodity, activated carbon, and avoid a waste stream going directly into landfills or the environment. The production of activated carbon also fulfills the regulatory requirement of destroying spent *cannabis* biomass.

The invention can also potentially cut the cost of the waste management of *cannabis* companies. Also, the treatment described herein is generally a low-cost process compared to other methods of producing activated carbon.

For the recycling treatment, spent *cannabis* biomass is mixed with an activating agent, put into an oxygen-free fixed bed reactor and subjected to high temperatures (100 to 900° C.) for a period of time (about 4 to about 8 hours).

The present invention also aims to recover the leftover cannabinoids as an oil during the process of converting spent *cannabis* biomass to activated carbon. Considering that production scale operations deal with hundreds of kilograms of biomass per day, capturing the remaining cannabinoids, which would otherwise be disposed of, results in an appreciable recovery over time.

Disclosed herein is a process for treating spent *cannabis* biomass comprising: mixing spent *cannabis* biomass with an activating agent to result in an impregnated spent *cannabis* biomass; raising the impregnated spent *cannabis* biomass to a first temperature that is sufficient to remove water and volatile components from the impregnated spent *cannabis* biomass; raising the impregnated spent *cannabis* biomass to a second temperature that is sufficient to recover cannabinoids from the impregnated spent *cannabis* biomass, wherein the second temperature is higher than the first temperature; raising to a third temperature the impregnated spent *cannabis* biomass, wherein the third temperature is higher than the second temperature; and maintaining the impregnated spent *cannabis* biomass at the third temperature until the impregnated spent *cannabis* biomass has been transformed into activated carbon.

Also disclosed is a process for treating spent *cannabis* biomass comprising: mixing spent *cannabis* biomass with an activating agent to result in an impregnated spent *cannabis* biomass; raising the impregnated spent *cannabis* biomass to a first temperature that is sufficient to remove water and volatile components from the impregnated spent *cannabis* biomass; raising the impregnated spent *cannabis* biomass to a second temperature that is sufficient to recover cannabinoids from the impregnated spent *cannabis* biomass, wherein the second temperature is higher than the first temperature; collecting the recovered cannabinoids by directing them into chilled ethanol; raising to a third temperature the impregnated spent *cannabis* biomass, wherein the third temperature is higher than the second temperature; and maintaining the impregnated spent *cannabis* biomass at the third temperature until the impregnated spent *cannabis* biomass has been transformed into activated carbon.

BRIEF DESCRIPTION OF THE DRAWINGS

The following drawings illustrate embodiments of the invention, which should not be construed as restricting the scope of the invention in any way.

DESCRIPTION

A. Glossary

The term "activation" may refer to the process for transforming the biomass into activated carbon. In the present invention, the activation is partially a chemical process that involves mixing the biomass with an activating agent and partially a heating process to transform the biomass into activated carbon, also known as activated charcoal.

The term "cannabinoids" may refer to a group of chemicals that act on cannabinoid receptors in the body, numerous of which are found in the *cannabis* plant.

The term "impregnation" may refer to the action of subjecting a material to a substance which penetrates the structure of the material.

The term "spent" in relation to *cannabis* biomass may refer to *cannabis* biomass that has been subjected to at least one extraction process and has thereby had at least some of its cannabinoids removed.

B. Overview

Figure 1:
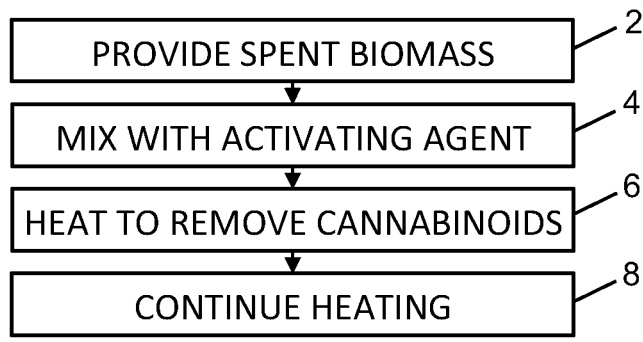
FIG. 1 is a high-level flowchart describing the process for the treatment of spent *cannabis* biomass according to an embodiment of the present invention.

FIG. 1 shows a high-level flowchart describing the process used for the treatment of spent *cannabis* biomass. In step 2, the spent *cannabis* biomass is provided, from a *cannabis* extraction process. After that, in step 4, the spent *cannabis* biomass is mixed with an activating agent, which impregnates the spent *cannabis* biomass. Then, in step 6, the impregnated spent *cannabis* biomass is heated to remove the cannabinoids from the impregnated spent *cannabis* biomass according to a stepped temperature profile. In step 8, the impregnated spent *cannabis* biomass is further heated to form activated carbon.

C. Exemplary Process

Figure 2:
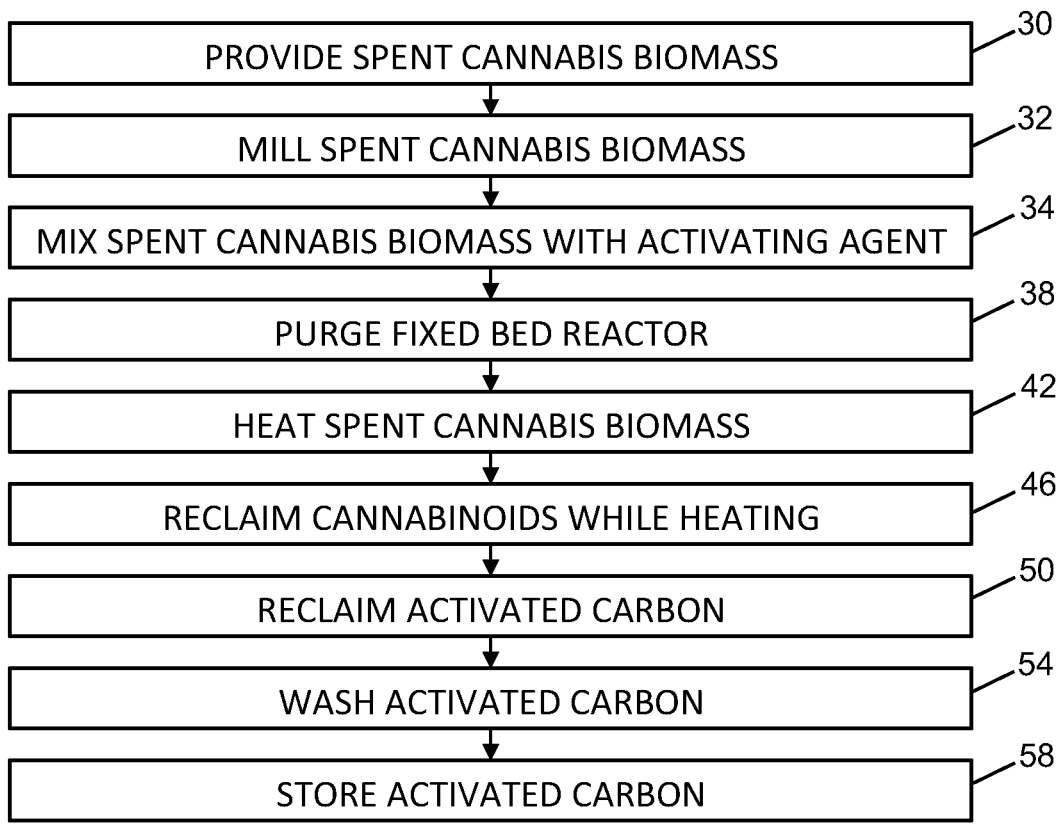
FIG. 2 is a detailed flowchart describing the process used for the treatment of spent *cannabis* biomass according to an embodiment of the present invention.

Referring to FIG. 2, the spent *cannabis* biomass is provided in step 30, from a *cannabis* extraction process.

Then, the spent *cannabis* biomass is optionally milled in step 32 using a milling machine. In some embodiments, the spent *cannabis* biomass is milled to an average particle size of below 2 mm, for example to provide accessibility to increased surface area. Milling is not typically necessary, as the *cannabis* has often been previously ground for the prior extraction process. The particle size of the spent *cannabis* biomass has an influence on the treatment. For example, the consistency of the milled spent *cannabis* biomass may cause pressure changes in the fixed bed reactor, which may lead to a higher energy consumption during the process.

In some embodiments, the spent *cannabis* biomass is dried before or after step 32. In some embodiments, the spent *cannabis* biomass is dried in a vacuum oven at a pressure of <2 kPa or in a dry room with a dehumidifier air controller. In some embodiments, the moisture content of the spent *cannabis* biomass is measured using a hygrometer, thermogravimetric moisture analyzer or Karl Fischer titration. In some embodiments, moisture content may be monitored since it has an influence on the efficiency of the impregnation step of the milled spent *cannabis* biomass.

In step 34, the milled spent *cannabis* biomass is mixed with an activating agent in a mixing vessel to result in an impregnated spent *cannabis* biomass. The ratio between the mass of milled spent *cannabis* biomass and the mass of activating agent is known as an impregnation ratio. In some embodiments, the impregnation ratios are between 1:0.5 and 1:3, where the biomass is dry. A too high proportion of activating agent used during the mixing step 34 usually results in a decrease in porosity in the activated carbon, which may be undesirable. In some embodiments, the impregnation ratio is 1:1. In some embodiments, the mixing vessel is made of stainless-steel. The milled spent *cannabis* biomass is mixed vigorously with the activating agent until it forms a homogeneous mixture.

The speed of the mixing is optimized to increase the efficiency of the impregnation process between the activating agent and the milled spent *cannabis* biomass. The duration of the mixing step 34 is between a few hours (e.g. 2) to 24 hours and is chosen in such a way that the impregnation of the milled spent *cannabis* biomass by the activating agent is maximized. In some embodiments, the speed of the mixing is optimized in regard to the chosen impregnation ratio. In some embodiments, when using $H_3PO_4$ as activating agent, the mixing step 34 is carried out at a temperature of 85° C. for 24 hours.

In some embodiments, the reaction between the milled spent *cannabis* biomass and the activating agent is achieved by soaking the milled spent *cannabis* biomass in a vessel containing the activating agent. Optionally, the temperature in the vessel may be increased to accelerate the transformation of the impregnated spent *cannabis* biomass into activated carbon.

The activating agents are $H_3PO_4$ (phosphoric acid), $ZnCl_2$ (zinc chloride) or alkali metal hydroxide such as KOH (potassium hydroxide). These activating agents trigger the dehydration and the degradation of several structural components of the impregnated spent *cannabis* biomass such as cellulose, lignin or hemicellulose. As a result, the activating agents fill the empty spaces or voids in the remaining structure and thus define the final porosity of the structure. The presence of the activating agent also inhibits the shrinkage of the biomass particles by preventing the formation of tars during the treatment. Indeed, the tars, if not expelled, may be responsible for blocking the pores of the final structure. As a consequence, use of an activating agent can achieve higher degrees of porosity for the obtained activated carbon compared to a physical activation process. The use of $H_3PO_4$ induces less contamination in the final product than $ZnCl_2$.

At the end of the mixing step 34, the impregnated spent *cannabis* biomass is collected, then placed in a fixed bed reactor.

The atmosphere in the fixed bed reactor is purged to remove oxygen in step 38. For example, the purge of the fixed bed reactor atmosphere is achieved by injecting nitrogen gas or other inert gas. In some embodiments, the impregnated spent *cannabis* biomass is placed under vacuum. The inert gas is injected into the fixed bed reactor in such a way that a continuous flow is created inside the fixed bed reactor during both the purge and the subsequent heating stages.

The temperature of the fixed bed reactor is set to reach a final temperature between 500° C. and 900° C. in step 42. In some embodiments, different heating rates and different heating profiles are implemented to reach the final temperature. A controlled heating profile is used such that known components are made to leave the impregnated spent *cannabis* biomass at a desired time. The impregnated spent *cannabis* biomass is treated in the fixed bed reactor for an overall duration of 4 to 8 hours, for example. As the temperature of the fixed bed reactor increases, and approaches about 100° C., water or solvent present in the *cannabis* biomass evaporate from the biomass.

During step 46, with continued heating, cannabinoids are collected from the impregnated, heated, spent *cannabis* biomass prior to its reaching the uppermost set temperature. Above about 170° C., cannabinoids start to evaporate. When the impregnated spent *cannabis* biomass is exposed to a temperature above 230° C., most of the cannabinoid components from the impregnated spent *cannabis* biomass are vaporized.

In step 46, the temperature in the fixed bed reactor is maintained constant, for example at 500° C., to vaporize all the cannabinoids from the impregnated spent *cannabis* biomass. The vaporized cannabinoids are collected using a cold trap or condenser. The cold trap may contain cold ethanol in order to capture the vaporized cannabinoids to form a mixture of crude oil and ethanol. In some embodiments, the target temperature for step 46 is chosen in order to selectively capture one or more cannabinoids. In that embodiment, the target temperature corresponds to the boiling point of the targeted cannabinoid. The targeted cannabinoid is then vaporized and passed through the cold trap to be captured from the inert gas flow.

For the capture of cannabinoids, the activating agent is chosen in such a way that it will not degrade the cannabinoids. In addition, the activating agent will not have a boiling point that is close to the range of the boiling points of the cannabinoids in order to obtain a mixture of crude oil and ethanol that is free of activating agent.

In some embodiments, the mixture of crude oil and ethanol may be subsequently centrifuged or run through a rotary evaporator or falling film evaporator to extract the crude oil from the mixture. In some embodiments, various filtration processes such as membrane filtration and/or activated carbon filtration are used to refine the crude oil. In some embodiments, the crude oil may be distilled with a distillation setup such as a film wipe distillation or spinning band fractional distillation to refine the crude oil, remove impurities and/or separate cannabinoids from each other.

During the treatment, the impregnated spent *cannabis* biomass loses its non-carbon elements. As a result, the remaining material in the fixed bed reactor is carbon with a structure, known as activated carbon. An assembly of aromatic sheets and strips provides the overall structure of the activated carbon. The porosity of the activated carbon is defined by the spaces or pores located between the main structural elements of the activated carbon. In some embodiments, the tar is also collected during the treatment.

In step 50, after cooling, the activated carbon is collected from the fixed bed reactor.

In step 54, the activated carbon is washed in order to remove the activating agent from the activated carbon. The impregnation ratio loosely defines the number of washing steps. An impregnated spent *cannabis* biomass with a high proportion of activating agent generally requires more washing steps than for a low proportion of activating agent, in order to remove a higher content of salts and impurities from the activated carbon. In some embodiments, the activating agent is reclaimed during the washing step via a recovery unit. In some embodiments, the activating agent is removed from activated carbon by leaching with water. When using an acidic activating agent, hot deionized water may be used to wash the activated carbon. When using an alkaline activating agent, diluted HCl or other acid may be used for an initial washing step before a final wash with deionized water. In some embodiments, other organic solvent may be used to wash the activated carbon.

Optionally, the activated carbon is dried after being washed.

The activated carbon is then stored at room temperature in step 58. Optionally, the activated carbon is stored in an environment with a low humidity index.

In some embodiments, the activated carbon is optionally sifted to obtain a desired particle size range. In some embodiments, particle size reduction techniques are applied in order to obtain a desired particle size range.

In some embodiments, the collected activated carbon has a surface area between 600 and 3000 $m^2/g$. In some embodiments, additional treatments are applied to increase the purity of the activated carbon.

The purity of the collected activated carbon is usually at least 90%. The conditions responsible for the purity of the activated carbon are the initial consistency of the milled spent *cannabis* biomass, the activating agent, the impregnation ratio, the temperature of the treatment, the heating profile and the duration of the treatment.

The yield of the treatment is between 10 and 50% of the initial dry spent *cannabis* biomass weight. This yield depends on the consistency of the initial milled spent *cannabis* biomass and the treatment conditions such as the temperature, the type of impregnation, and the duration.

Figure 3:
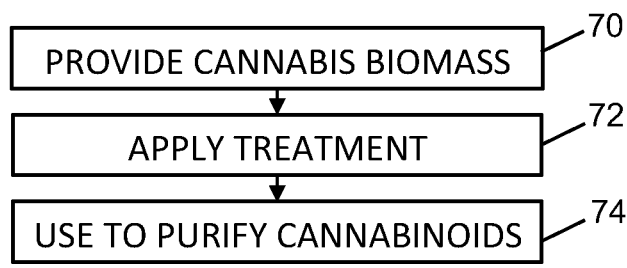
FIG. 3 is high-level flowchart describing the process for using recycled, spent *cannabis* biomass in the purification of cannabinoids, according to an embodiment of the present invention.

Referring to FIG. 3, the spent *cannabis* biomass is provided in step 70, from a *cannabis* extraction process. The spent *cannabis* biomass is treated in step 72 to form activated carbon. Then, in step 74, the activated carbon obtained during the treatment (step 72) is used in a purification process to filter out unwanted components in a *cannabis* extraction process. In this way, the *cannabis* from which cannabinoids are extracted is reused in a process to purify cannabinoids in a subsequent extraction process. This reduces the amount of waste generated by the *cannabis* industry.

Figure 4:
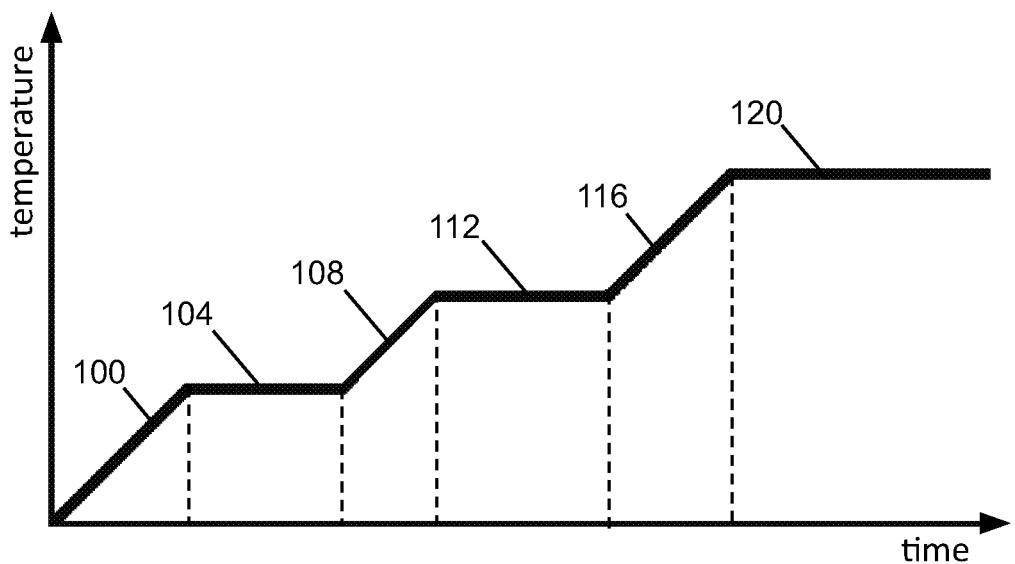
FIG. 4 is a graph representing the heating profile for the treatment of spent *cannabis* biomass according to an embodiment of the present invention.

Referring to FIG. 4, there is a graph representing an exemplary heating profile of the treatment. In step 100, the impregnated spent *cannabis* biomass is heated to a temperature of about 100° C. to release water and low boiling point (<100° C.) volatile components from the impregnated spent *cannabis* biomass.

Water and these volatiles components are directed to bypass the cold trap, so that they are removed from the fixed bed reactor without being captured. In some embodiments, the volatile components and water are captured via an additional cold trap for waste disposal purposes or other usage. Step 100 is the first step of the gasification process. In step 104, the temperature is maintained at 100° C. for over 20 minutes, for example, in order to evaporate all the water and low boiling point volatiles.

In other embodiments, other temperatures may be used for step 104, provided that they allow the water and low boiling point volatiles to evaporate from the impregnated spent *cannabis* biomass without evaporation of the cannabinoids that are to be reclaimed in a later step.

In step 108, the cold trap is engaged, and the impregnated spent *cannabis* biomass is further heated to a temperature of 500° C. in order to evaporate the cannabinoids contained in the impregnated spent *cannabis* biomass. Most of the cannabinoids have a boiling point that is within the temperature range of 120-175° C.; however, when vaporizing cannabinoids, temperatures in the range 170-230° C. are typically used. While these lower temperatures may be used in some embodiments, it is useful in other embodiments to use higher temperatures, in the range 230-500° C., in order to reduce the time and increase the efficiency of the process.

In step 112, the temperature of 500° C. is maintained for a substantial time (e.g. 20 minutes to 1 hour) in order to reclaim all of the cannabinoids from the impregnated spent cannabis biomass. This is the second part of the gasification process. The duration of step 112 is related to the quality of the initial spent *cannabis* biomass.

The vaporized cannabinoids are captured by condensation in the cold trap, with cold ethanol. The inert gas (e.g. nitrogen) passes through the oven and carries the vaporized cannabinoids to leave the heated impregnated spent *cannabis* biomass, and to bubble through the cold ethanol. As a result, the vaporized cannabinoids dissolve in the ethanol to form a mixture of crude oil and ethanol.

In other embodiments, other temperatures may be used for step 112, provided that they allow the cannabinoids that are to be reclaimed to evaporate from the impregnated spent *cannabis* biomass without significant degradation.

After the cannabinoids have been recovered, the impregnated spent *cannabis* biomass is heated from a temperature of 500° C. to a temperature of 700° C. in step 116. In some embodiments, the start and end temperatures for step 116 are different.

In step 120, the temperature in the fixed bed reactor is maintained at 700° C. for 1 hour in order to convert the impregnated spent *cannabis* biomass to activated carbon. In some embodiments, the duration of step 120 is optimized to obtain a desired porosity of the final activated carbon. In some embodiments, the temperature of step 120 is different, as long as it is sufficiently high to complete the formation of the activated carbon from the impregnated spent *cannabis* biomass.

In some embodiments, the specific time and heating rate for each heating ramp and the target temperature for each step may require optimization to convert the totality of the impregnated spent *cannabis* biomass to activated carbon. In addition, the target temperature for each step may also require optimization to increase the overall efficiency of the process.

The cannabinoid rich oil is recovered from steps 108, 112 and further refined using distillation procedures such as film wipe distillation, if necessary. Different extraction procedures are used for different makeups of incoming crude oil. Crude oil from ethanol extraction would have some trace ethanol volatiles, whereas crude oil from $CO_2$ extraction would not, so the distillation profile would change accordingly.

This technique may also be used for denatured biomass. In this embodiment, denatured biomass is usually mixed with excess water and cat litter in order to be neutralized. In this case, the water capture step takes longer, but the end result, i.e. activated carbon, is the same.

Instead of spent biomass, fresh or dried *cannabis* may be used to reclaim cannabinoid rich oil with higher potency. In some embodiments, the spent *cannabis* biomass is dried in a dry room with a dehumidifier air controller, or it may be flash dried in a vacuum oven before or after the milling step 32.

In some cases, a larger condenser is used to collect the cannabinoids from the cannabinoid rich oil.

D. Exemplary Apparatus

Figure 5:
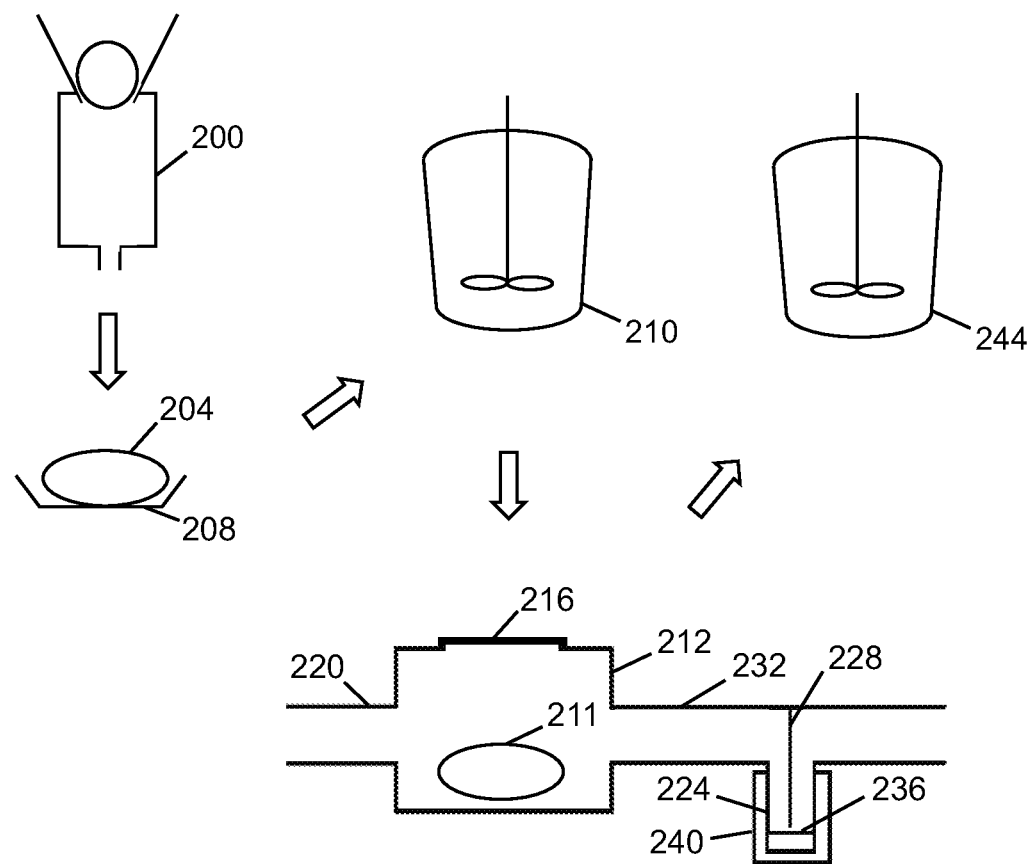
FIG. 5 is a schematic diagram of the apparatus used for the treatment according to an embodiment of the present invention.

Referring to FIG. 5, the spent *cannabis* biomass is optionally loaded into a milling machine 200. In some embodiments, other techniques or ways of reducing the size of the spent *cannabis* biomass may be used. For example, an impact crusher, pulverizers, breakers, or grinders may be used. The milled spent *cannabis* biomass 204 is collected on a tray 208.

The milled spent *cannabis* biomass 204 is then placed into a mixing vessel 210 containing an amount of activating agent that provides an impregnation ratio between 1:0.5 and 1:3 (biomass to activating agent ratio). The mixed spent *cannabis* biomass 204 is then mixed with the activating agent to form an impregnated spent *cannabis* biomass.

After that, the impregnated spent *cannabis* biomass 211 is placed into the fixed bed reactor 212 via an opening at the top that is closed with a lid 216. In some embodiments, a heat furnace, a tube reactor, a kiln, a moving bed reactor, a trickle-bed reactor, a rotating bed reactor or a fluidized bed reactor is used in place of the fixed bed reactor 212 for the treatment.

The fixed bed reactor 212 is then purged to remove oxygen by injecting an inert gas such as nitrogen or purified argon via an inlet 220 located on the reactor. The inert gas is injected in a continuous flow into the fixed bed reactor 212 during the subsequent steps.

The temperature in the fixed bed reactor 212 is raised to 100° C. During this first heating ramp, the cold trap or condenser 224 is disengaged from the fixed bed reactor 212 so that the water vapor and low boiling point volatile components evaporating from the impregnated spent *cannabis* biomass 211 are not captured. A bypass system 228 (e.g. a baffle, door or flap) is used in order to engage or disengage the cold trap 224 in the exhaust line 232 of the fixed bed reactor 212. In some embodiments, one or more additional cold traps (not shown) are mounted in the exhaust line 232 downstream of the cold trap 224. The temperature of the fixed bed reactor 212 is maintained at 100° C. for sufficient time to evaporate all the water and volatile components from the impregnated spent *cannabis* biomass 211.

After that, the temperature is raised to 500° C. During this second heating ramp, the cold trap 224 is engaged in the exhaust line 232 in order to capture the volatized cannabinoids from the impregnated spent *cannabis* biomass 211. The inert gas flow through the fixed bed reactor 212 directs the volatized cannabinoids towards the cold trap 224. The volatized cannabinoids with inert gas bubble through cold ethanol 236 contained in the cold trap 224. The volatized cannabinoids dissolve in the cold ethanol 236 to form a mixture of crude oil and ethanol. The cold ethanol 236 in the cold trap 224 is maintained at a cold temperature (i.e. from 0° C. to −40° C.) using a cooling system 240 on the cold trap, such as a cooling jacket containing solid $CO_2$ or liquid nitrogen. The temperature in the fixed bed reactor 212 is then maintained at 500° C. to vaporize all the cannabinoids from the impregnated spent *cannabis* biomass 211, while retaining the cold trap 224 in the path of the exhaust 232. After that, the mixture of ethanol and crude oil is removed from the cold trap 224 and collected. In some embodiments, the collected mixture is refined in order to collect cannabinoids and/or reclaim the ethanol.

The temperature in the fixed bed reactor 212 is then raised to 700° C. During this third heating ramp, the cold trap 224 is disengaged from the exhaust line 232.

The temperature is maintained at 700° C. for 1 hour. After the process, activated carbon may be removed manually or automatically from the fixed bed reactor 212, or after the temperature has been reduced to about room temperature. The resulting activated carbon is then allowed to fully cool and stored at room temperature.

The activated carbon is then added into a mixing vessel 244 in order to be washed.

Optionally, the activated carbon is put in a drying room in order to be dried. For spent *cannabis* biomass initially impregnated with an acidic activating agent, the obtained activated carbon is washed with hot deionized water. For spent *cannabis* biomass initially impregnated with an alkaline activating agent, the obtained activated carbon is washed with, for example, diluted HCl before a final rinse with deionized water.

Optionally, the dried activated carbon is sifted using a sieve such as a vibratory sieve or a centrifugal sieve in order to obtain a desired particle size range.

Optionally, the activated carbon is stored in a sealed container. This prevents the activated carbon from absorbing latent compounds present in the environment.

The chemical activation process described herein involves lower temperatures than physical activation, which is an energy saving benefit. In comparison with physical activation, chemical activation usually has a higher yield.

In some embodiments, a larger condenser is used to capture cannabinoids from the impregnated spent *cannabis* biomass with a higher expected return.

E. Variations

In general, unless otherwise indicated, singular elements may be in the plural and vice versa with no loss of generality.

In some embodiments, the temperature for step 104 is maintained at a specified value within a ±10% range. In some embodiments, the temperature for step 112 is maintained at a specified value within a ±10% range.

Specified temperature values may be different in other embodiments. For example, the first temperature plateau may be set at anything from 80° C. to 120° C. The temperature of the second plateau may be set at anything between 170° C. to 230° C. In other embodiments, the second plateau may be set at a temperature between 170° C. and 500° C.

Time intervals may be different to the examples given herein. For example, the dwell times at the temperature plateaus may be different depending on the amount of biomass and the heating power of the flat bed reactor. The times taken for ramping the temperature may also be different.

In some embodiments, one or more intervening heating plateaus may be applied during the second heating ramp 108 in order to selectively evaporate one or more cannabinoids. The temperature for the intervening heating plateau is maintained for a given value with a ±0.5° C. range. For example, the temperature may be maintained at a temperature of 230±0.5° C.

In some embodiments, a high surface area condenser is used to capture the cannabinoids instead of a cold trap. This condenser is subsequently heated in order to collect the cannabinoids.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. For example, various pumps, valves, jackets and lines are not shown for clarity. Accordingly, the specification and drawings are to be regarded in an illustrative, rather than a restrictive, sense.

Each embodiment provided herein provides one or more of the advantages described in relation to the invention, depending on its particular configuration.

It will be clear to one having skill in the art that further variations to the specific details disclosed herein can be made, resulting in other embodiments that are within the scope of the invention disclosed. Steps in the flowchart may be performed in a different order, other steps may be added, or one or more may be removed without altering the main outcome of the process. All parameters, dimensions, materials, and configurations described with respect to a specific embodiment are examples only and may be changed depending on the specific embodiment. Accordingly, the scope of the invention is to be construed in accordance with the substance defined by the following claims.

The invention claimed is:

1. A process for treating spent *cannabis* biomass comprising:
   mixing spent *cannabis* biomass with an activating agent to result in an impregnated spent *cannabis* biomass;
   raising the impregnated spent *cannabis* biomass to a first temperature that is sufficient to remove water and volatile components from the impregnated spent *cannabis* biomass;
   raising the impregnated spent *cannabis* biomass to a second temperature that is sufficient to recover cannabinoids from the impregnated spent *cannabis* biomass, wherein the second temperature is higher than the first temperature;
   collecting the recovered cannabinoids by directing them into chilled ethanol:
   raising to a third temperature the impregnated spent *cannabis* biomass, wherein the third temperature is higher than the second temperature; and
   maintaining the impregnated spent *cannabis* biomass at the third temperature until the impregnated spent *cannabis* biomass has been transformed into activated carbon.

2. The process of claim 1, wherein:
   the activating agent is KOH, $H_3PO_4$ or $ZnCl_2$; and
   the spent *cannabis* biomass is mixed with the activating agent at a ratio of between 1:0.5 and 1:3 by weight.

3. The process of claim 1, wherein the activating agent is mixed with the spent *cannabis* biomass for 2 to 24 hours.

4. The process of claim 1, wherein:
   the impregnated spent *cannabis* biomass is maintained at the third temperature for 0.5 to 2 hours; and
   the third temperature is between 500 and 900° C.

5. The process of claim 1, wherein the first temperature is 100±20° C. and the second temperature is 170-500° C.

6. The process of claim 5, wherein the first temperature is 100° C. and the second temperature is 500° C.

7. The process of claim 1, wherein the impregnated spent *cannabis* biomass is heated in a fixed bed reactor that has an exhaust line with a bypassable cold trap, the process comprising purging the fixed bed reactor with nitrogen before heating the impregnated spent *cannabis* biomass.

8. The process of claim 7, comprising, while raising the impregnated spent *cannabis* biomass to the first temperature, directing vapor evaporated from the impregnated spent *cannabis* biomass to bypass the cold trap.

9. The process of claim 8, comprising, while raising the impregnated spent *cannabis* biomass from the first temperature to the second temperature, passing vapor evaporated from the impregnated spent *cannabis* biomass through the cold trap.

10. The process of claim 1, comprising maintaining the impregnated spent *cannabis* biomass at the first temperature until all the water is removed from the impregnated spent *cannabis* biomass.

11. The process of claim 1, comprising collecting water and volatile components from the impregnated spent *can-*

*nabis* biomass using a cold trap, while the impregnated spent *cannabis* biomass is below and at the first temperature.

12. The process of claim 1, comprising maintaining the impregnated spent *cannabis* biomass at the second temperature until all the cannabinoids have been recovered from the impregnated spent *cannabis* biomass.

13. The process of claim 1, comprising maintaining the impregnated spent *cannabis* biomass at the third temperature for 1 hour.

14. The process of claim 1, comprising passing nitrogen gas over the impregnated spent *cannabis* biomass throughout the process.

15. The process of claim 1, comprising milling the spent *cannabis* biomass to an average particle size below 2 mm prior to mixing the spent *cannabis* biomass with the activating agent.

16. The process of claim 1, comprising washing the activated carbon with hot deionized water when the activating agent is acidic.

17. The process of claim 1, comprising washing the activated carbon with a diluted HCl solution and then washing the activated carbon with deionized water, when the activating agent is alkaline.

18. The process of claim 1, wherein the chilled ethanol is at a temperature between 0° C. and −40° C.

* * * * *